United States Patent
Lesage et al.

(10) Patent No.: US 7,427,077 B2
(45) Date of Patent: Sep. 23, 2008

(54) REAR SUSPENSION OF A TWO-WHEEL VEHICLE OR THE LIKE

(75) Inventors: Philippe Lesage, Dammarie-les-Lys (FR); Emmanuel Antonot, Clenay (FR)

(73) Assignee: Cycles Lapierre (FR)

( * ) Notice: Subject to any disclaimer, the term of this patent is extended or adjusted under 35 U.S.C. 154(b) by 222 days.

(21) Appl. No.: 11/105,226

(22) Filed: Apr. 13, 2005

(65) Prior Publication Data
US 2006/0061059 A1    Mar. 23, 2006

(30) Foreign Application Priority Data
Jul. 10, 2004    (FR) .................................... 04 07729

(51) Int. Cl.
*B62K 3/00*    (2006.01)
(52) U.S. Cl. ...................... 280/284; 280/285
(58) Field of Classification Search ................. 280/284, 280/285
See application file for complete search history.

(56) References Cited

U.S. PATENT DOCUMENTS

| | | | | |
|---|---|---|---|---|
| 4,515,236 A | * | 5/1985 | Kanamori | 180/227 |
| 4,951,791 A | * | 8/1990 | Belil Creixelli | 180/219 |
| 5,226,674 A | * | 7/1993 | Buell et al. | 280/284 |
| 5,335,929 A | * | 8/1994 | Takagaki et al. | 280/283 |
| 6,102,421 A | * | 8/2000 | Lawwill et al. | 280/284 |
| 6,450,520 B1 | * | 9/2002 | Girard | 280/284 |
| RE39,159 E | * | 7/2006 | Klassen et al. | 280/284 |
| 7,128,329 B2 | * | 10/2006 | Weagle | 280/284 |
| 2002/0109332 A1 | | 8/2002 | Ellsworth | |
| 2003/0038450 A1 | * | 2/2003 | Lam | 280/284 |
| 2005/0285367 A1 | * | 12/2005 | Chang et al. | 280/284 |
| 2006/0181053 A1 | * | 8/2006 | Huang et al. | 280/284 |

FOREIGN PATENT DOCUMENTS

| | | |
|---|---|---|
| DE | 44 35 482 | 4/1996 |
| FR | 2 762 572 | 10/1998 |
| FR | 2 774 966 | 8/1999 |
| WO | WO-03/018392 | 3/2003 |

* cited by examiner

*Primary Examiner*—Lesley D. Morris
*Assistant Examiner*—Maurice Williams
(74) *Attorney, Agent, or Firm*—Connolly Bove Lodge & Hutz LLP (57) ABSTRACT

A rear suspension for a vehicle such as a bicycle or motorcycle that includes a frame, a swinging arm integral with the frame carrying the axle of a drive wheel hub and a shock absorber whose ends are secured to the frame and to the swinging arm, the swinging arm being secured to said frame by at least two articulation means so that the swinging arm pivots about an "instantaneous centre of rotation" that is movable when the hub is displaced on either side of its reference position corresponding to the position of the hub axle when the vehicle is in a static equilibrium position, characterized in that the instantaneous centre of rotation is displaced upwards along a parabolic path, the asymptote of which is oriented towards the rear free end of the swinging arm carrying the axle of the hub when said hub is displaced above its reference position.

37 Claims, 4 Drawing Sheets

REAR SUSPENSION OF A TWO-WHEEL VEHICLE OR THE LIKE

FIELD OF THE INVENTION

The present invention relates to an improvement to a rear suspension of a vehicle such as a bicycle, a motorcycle or the like, of the type that includes a frame, a swinging arm integral with the frame and carrying the axle of the hub of a rear drive wheel and a shock absorber whose ends are secured, respectively, to the frame and to the swinging arm, said suspension generating an "anti-pumping" effect.

BACKGROUND OF THE INVENTION

Mountain bikes - "MTBs" - whose rear suspension consists of a swinging arm articulated at the bottom part of the seat tube and interacting with a shock absorber are well known. Said swinging arm pivots about a fixed rod parallel to the axle of the drive sprocket carried by the bottom bracket positioned at the lower end of the frame, i.e. at the intersection of the down tube and the seat tube of the frame. Furthermore, the ends of the shock absorber are secured to the swinging arm and, respectively, to the horizontal tube connecting the seat tube to the bike's forks or to an intermediate tube extending globally from the bottom bracket to the horizontal tube, said seat tube being interrupted in order to allow the shock absorber to pass.

When there is an energetic kick on the pedals, such as a kick on the pedal in order to move the bike off or when the cyclist stands out of the saddle, on the pedals, this type of rear suspension generates a "pumping" effect resulting in a cyclical compression of the suspension, even on a perfectly level surface. This type of rear suspension thus has the drawback of dissipating some of the drive torque provided by the cyclist in the shock absorber instead of contributing to driving the bike along.

Also known are mountain bikes - "MTBs" - whose rear suspension consists of a swinging arm articulated on the seat tube and/or on the down tube of the frame by means of two rods or the like, said swinging arm or at least one of the rods interacting with a shock absorber. Said swinging arm thus pivots about a movable virtual pivot point, also called the instantaneous centre of rotation, which corresponds to the intersection of the straight lines passing via the respective axes of the rods. This is the case of patent application US 2002/0109332, for example, which describes such a rear suspension for a bike. The instantaneous centre is displaced in the lower front quadrant and is displaced rearwards and downwards when the swinging arm is displaced upwards when an obstacle such as a bump, for example, is overcome.

Such a rear suspension also has the drawback of generating a "pumping" effect resulting in a cyclical compression of the suspension even on a perfectly level surface, thus dissipating some of the drive torque provided by the cyclist in the shock absorber instead of contributing to driving the bike along.

Similarly, international patent application WO 03/018392, which describes a mountain bike - "MTB" - whose rear suspension consists of a swinging arm articulated on the seat tube by means of two rods or the like, one of the rods - the upper rod - interacting with a shock absorber. Said swinging arm thus pivots about a movable virtual pivot point, also called instantaneous centre of rotation, which corresponds to the intersection of the straight lines passing via the respective axes of the rods and is displaced forwards and downwards when the swinging arm is displaced upwards when an obstacle such as a bump, for example, is overcome.

This rear suspension also has the drawback of generating a particularly detrimental "pumping" effect.

In order to remedy this drawback, an "anti-pumping" MTB rear suspension has already been devised, as described in French patent FR 2 774 966. Such an MTB includes a frame, a swinging arm secured to the frame carrying the axle of the hub of a drive wheel and a shock absorber whose ends are secured, respectively, to the frame and to the swinging arm, the drive torque being transmitted to the drive wheel by a chain extending between a drive sprocket secured to the frame and a driven sprocket secured to the axle of the hub of the drive wheel, said chain between the drive and driven sprockets forming two strands, a tensioned upper strand that transmits the drive torque to the drive wheel and another, lower "return" strand. The swinging arm is secured to the frame by two rods, a first rod that connects the front end of the swinging arm to the down tube of the frame, said rod extending globally vertically, and a second rod that connects said swinging arm in its central part to the seat tube of the frame, said second rod extending globally horizontally. The instantaneous centre of rotation about which the swinging arm pivots, corresponding to the intersection of the straight lines passing via the respective axes of the rods, is aligned with the axis of the tensioned strand of the chain when the latter is on one of the chain-wheels of the pedals and bottom bracket bearing assembly, when the MTB is in a static equilibrium position, i.e. stationary, straddled by a cyclist of average weight, and is displaced upwards along a globally rectilinear path when the swinging arm pivots upwards, compressing the shock absorber's spring.

Also known is French patent FR 2 827 831, which describes a two-wheel vehicle with an "anti-pumping" rear suspension. The MTB is equipped with a rear suspension and includes a front frame carrying a bottom bracket and a swinging rear assembly carrying a rear drive wheel. The frame and the rear assembly are secured by two pivoting links and by a shock-absorber system. The first pivoting link is formed by a circular cam formed in a casing carrying an eccentric rod, said casing being mounted pivotably in a housing on the front frame. The rear assembly is fixed on the eccentric rod, on either side of the casing. The second pivoting link is formed by a rod consisting of a simple plate arranged in the general direction of the frame. In the same manner as previously, the instantaneous centre of rotation about which the swinging rear assembly pivots is displaced vertically along a globally rectilinear path.

Lastly, there is French patent FR 2 821 603, which describes an anti-pumping system for a wheeled vehicle, the drive torque of which is transmitted by means of a transmission chain to the drive wheel carried by a swinging arm. This MTB includes a triangular frame, a swinging arm secured to the frame and a shock absorber whose ends are secured, respectively, to the frame and to the swinging arm. Said swinging arm is secured to the frame by two rods extending globally perpendicularly with respect to one another, one of the rods extending globally vertically when the vehicle is in a static equilibrium position. The intersection of the straight lines passing via the axes of rotation of each rod forms the instantaneous centre of rotation about which the swinging arm pivots and is located in the upper rear quadrant of a reference system defined by a horizontal axis and a vertical axis convergent with the axis of the bottom bracket. This instantaneous centre of rotation is located on the upper strand of the chain or on the straight line extending it in a static equilibrium position and said instantaneous centre of rotation is displaced globally vertically along a straight line when the swinging arm pivots upwards.

All these devices, although generating an anti-pumping effect, have the drawback of resulting in a lengthening of the chain strand when the swinging arm is displaced upwards, which gives rise to a variation in chain tension that generates a kick-back effect that counteracts rotation of the pedals and bottom bracket bearing assembly. This kick-back effect gives rise to a disagreeable, jolting sensation for the cyclist.

In order to remedy the lengthening of the chain strand that gives rise to a kick-back effect when the swinging arm is displaced upwards when an obstacle is overcome, U.S. Pat. No. 5,553,881, U.S. Pat. No. 5,628,524, U.S. Pat. No. 6,206,397 and U.S. Pat. No. 6,488,301 are well known, which describe a suspension system for a bicycle. The bicycle includes a compressible rear suspension and a chain transmission that comprises a pedal-actuated drive chain wheel and a rear-wheel hub, said transmission having a chain-strand length that is the distance, in the rearward direction, from the axis of said pedal-actuated drive chain wheel to the axis of said rear-wheel hub, which is represented by a variable value CSL, and said suspension having means for displacing said rear-wheel hub in a direction oriented substantially upwards along a controlled wheel displacement path in response to a compression of said suspension, in which the position of said hub along said path from a predetermined starting point at which said suspension is in extension is represented by a variable value D that increases with the increase in the compression of said suspension. Said means give rise to a pivoting point, called the instantaneous centre of rotation or virtual pivoting point, defining the displacement path of the rear wheel such that said displacement path includes a preferred pedaling position at a predetermined position $D_p$ located along the rear-wheel displacement path, a lower curve segment extending substantially below said position $D_p$, in which the rate of lengthening of the chainstay increases with the increase in compression of said suspension system, such that the first derivative relationship $d[CSL]/d(D)$ is a curve having a generally positive slope, so that the second derivative relationship $d^2[CSL]/d(D))^2$ is generally positive, and an upper curve segment, curved upwards and forwards, extending substantially above said position $D_p$, in which the rate of lengthening of the chainstay decreases with the increase in compression of said suspension system, such that the first derivative relationship $d[CSL]/d(D)$ is a curve having a generally negative slope, so that the second derivative relationship $d^2[CSL]/d(D))^2$ is generally negative. Preferably, the lower curve segment of said rear-wheel displacement path comprises a first lower arc segment having an average radius extending forwards that is greater than an arc of constant radius from said axis of the drive chainwheel to said axis of the hub of the rear wheel and an upper arc segment having an average radius extending forwards that is less than said radius of said first lower arc segment, said lower arc segment joining said upper arc segment at a point of inflection close to said position $D_p$, such that a part of the lower curve segment has a general S shape and, furthermore, the rate of lengthening of the chain strand has a peak when D reaches and is displaced above said position $D_p$.

This type of bike rear suspension has the drawback, although it limits the kick-back effect, of not generating an anti-pumping effect, the instantaneous centre of rotation being displaced globally forwards and downwards when the swinging arm is displaced upwards.

BRIEF DESCRIPTION OF THE INVENTION

One of the objects of the invention is thus to remedy this drawback by proposing a rear suspension for a vehicle such as an MTB or the like of simple design and low cost, achieving an anti-pumping effect whilst limiting and even eliminating the kick-back effect.

To this end, and in accordance with the invention, there is proposed a rear suspension for a vehicle such as a bicycle, a motorcycle or the like, of the type that includes a frame, a swinging arm integral with the frame carrying the axle of the hub of a drive wheel and a-shock absorber whose ends are secured, respectively, to the frame and to the swinging arm, the drive torque being transmitted to the drive wheel by a chain extending between a drive sprocket secured to the frame and a driven sprocket secured to the axle of the hub of the drive wheel, said chain between the drive and driven sprockets forming two strands, the stretched, upper one, which transmits the drive torque to the rear drive wheel, and the other, "return" lower one, the swinging arm being secured to said frame by at least two articulation means so that the swinging arm pivots about an "instantaneous centre of rotation" point that is movable when the hub of the drive wheel is displaced on either side of its reference position corresponding to the position of the axle of the hub of the drive wheel when the vehicle is in a static equilibrium position; said suspension is noteworthy in that the instantaneous centre of rotation is displaced upwards along a parabolic path, the asymptote of which is oriented towards the rear free end of the swinging arm carrying the axle of the hub of the drive wheel when said hub of the drive wheel is displaced above its reference position.

Preferably, the instantaneous centre of rotation is located on the upper strand of the transmission chain or on the straight line extending it when the vehicle is in a static equilibrium position.

Thus, the instantaneous centre of rotation that is initially located on the upper strand of the transmission chain or on the straight line extending it is displaced upwards along a curved path oriented towards the rear hub of the swinging arm until it follows a globally horizontal rectilinear path, which eliminates the kick-back effect that is particularly unpleasant for the cyclist.

BRIEF DESCRIPTION OF THE DRAWINGS

Further advantages and characteristics will become more apparent from the following description of a plurality of variant embodiments that are given by way of non-limiting examples of the rear suspension according to the invention, with reference to the appended drawings, in which.

DETAILED DESCRIPTION OF THE INVENTION

A description will be given below by way of non-limiting example of a rear suspension of a bicycle of the mountain-bike (MTB) type. However, the rear suspension according to the invention could be adapted to any other vehicle without thereby departing from the scope of the invention.

Figure 1:
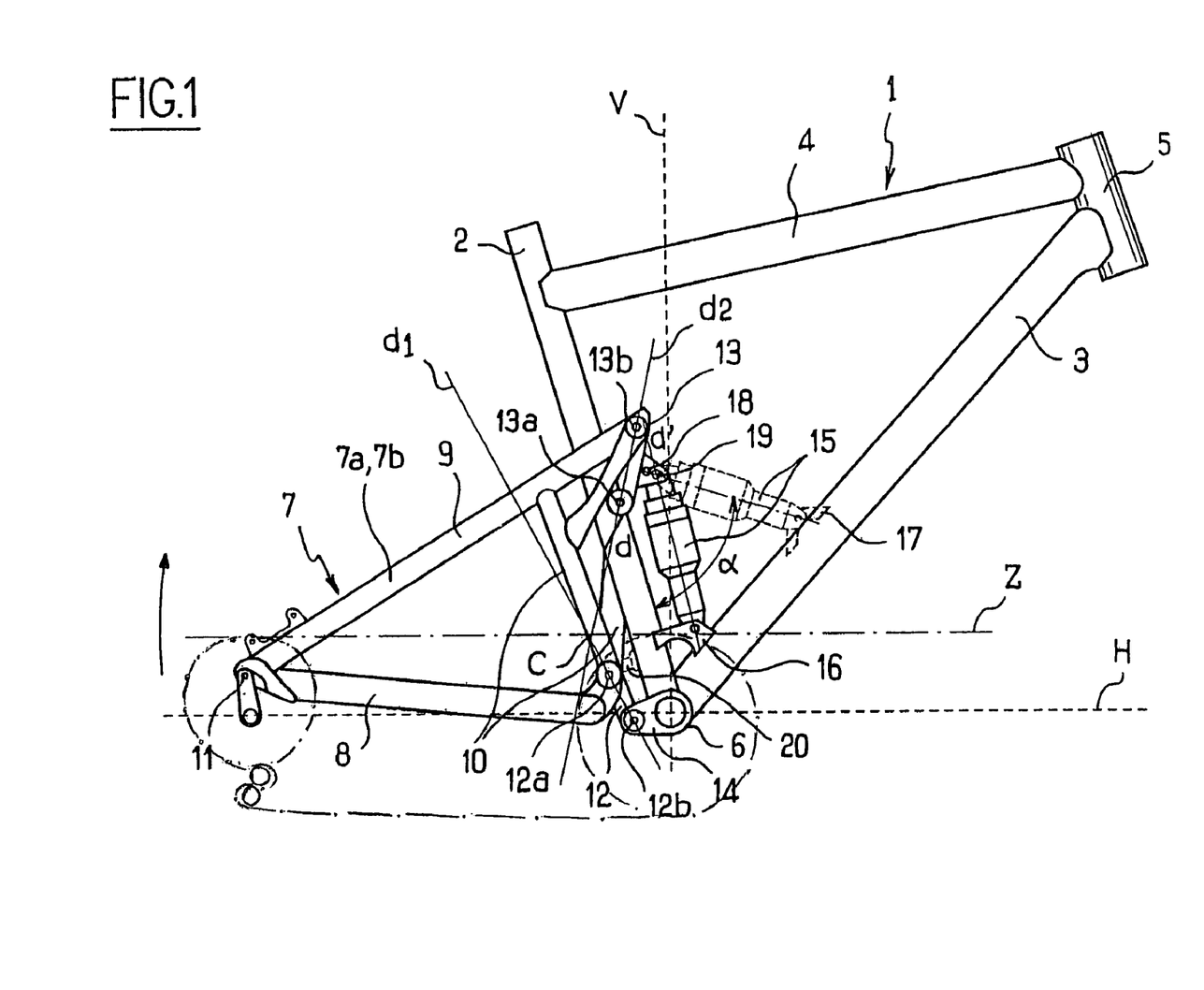
FIG. 1 is a partial side view of a bicycle equipped with a rear suspension according to the invention, only the frame and the swinging arm being shown.
Figure 2:
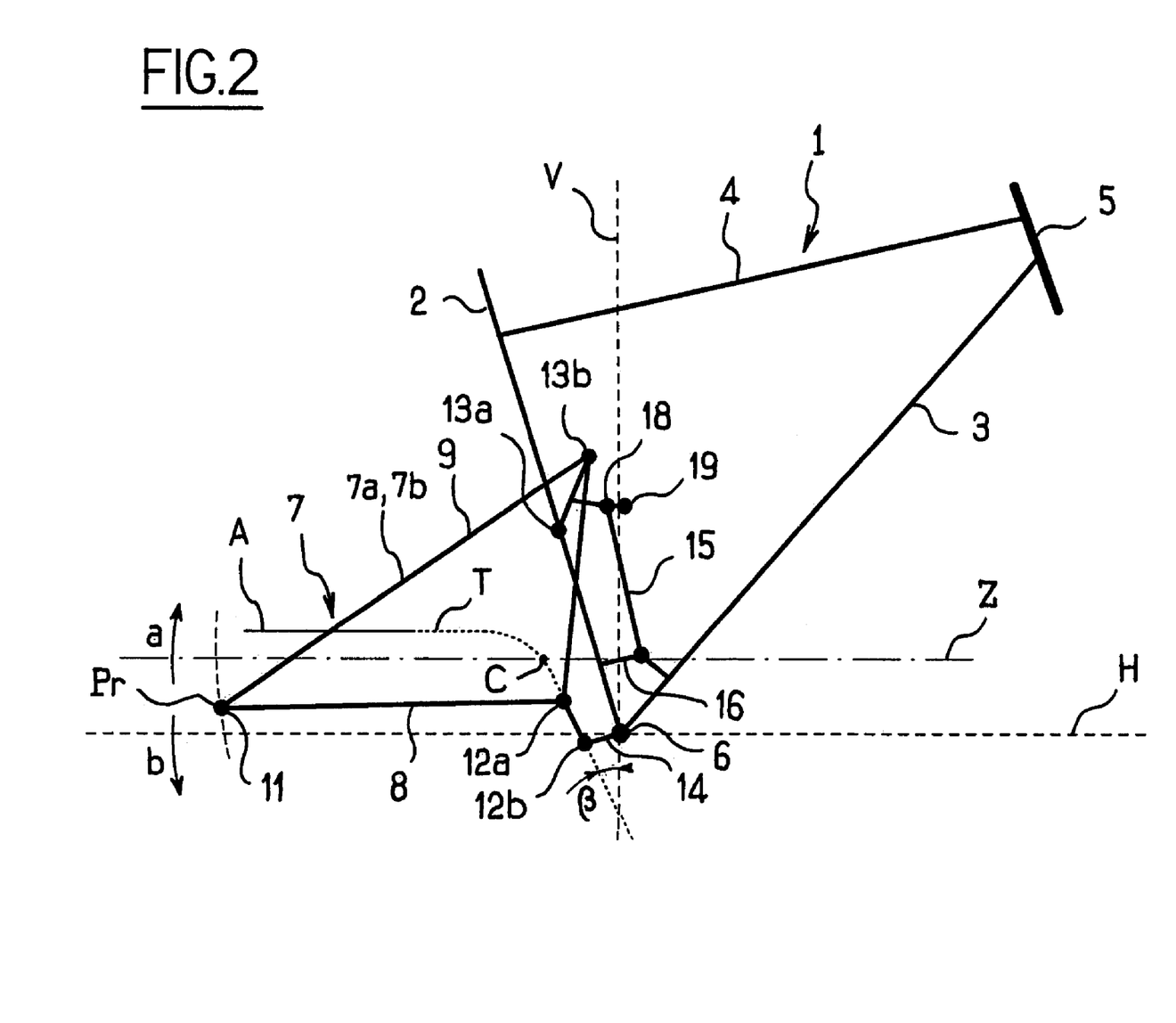
FIG. 2 is a diagrammatic representation of a bicycle equipped with a rear suspension according to the invention, on which the path of the instantaneous centre of rotation of the swinging arm is shown.

With reference to FIGS. 1 and 2, the MTB comprises a frame known as a triangulate frame consisting of a globally vertical seat tube 2, a down tube 3 welded to the lower end of the seat tube 2, a horizontal tube 4 assembled at the lower end of the seat tube 2 and a globally vertical fork tube 5, the down tube 3 being furthermore secured to said fork tube 5, also by means, of welding. Although this is not shown in FIG. 1, said fork tube 5 carries forks that comprise a suspension, preferably of the telescopic type, carrying, at its lower end, the axle of the hub of the front wheel. Quite obviously, handlebars are conventionally secured to the upper end of the forks, for steering the MTB. Furthermore, the seat tube 2 is capable of receiving a saddle stem comprising, at its upper end, a saddle on which the cyclist sits. The lower end of the seat tube 2 comprises, at the intersection of the down tube 3 and of the seat tube 2, a bottom bracket 6 conventionally carrying the axis of the drive sprockets, commonly called chainwheels, whose axes of rotation are coaxle, pedals being secured to said axle of the drive sprockets on either side of the frame 1 of the MTB.

The frame also comprises a swinging arm 7 consisting of two triangular assemblies 7a, 7b extending on either side from the central plane of the frame 1, said assemblies 7a, 7b of the swinging arm 7 being connected by one or more spacers (not shown in the figures). Each assembly 7a, 7b of the swinging arm 7 consists of a horizontal tube 8, a down tube 9 and a vertical tube 10 connected in pairs by means of welds. The intersection of the down tube 9 and of the horizontal tube 8 carries the axle 11 of a rear drive wheel (not shown in the figure), the latter quite obviously being driven in rotation by a transmission chain extending between the drive sprocket of the bottom bracket 6 and the driven sprocket carried by the axle 11 of the hub of the rear drive wheel. The swinging arm 7 is secured to the frame 1 by two rods 12 and 13, a first "lower" rod 12, whose axes of rotation 12a, 12b positioned at the free end of said lower rod 12 are, respectively, articulated at the intersection of the vertical tubes 10 and horizontal tubes 8 of the swinging arm 7 and on the bottom bracket 6 by means of a horizontal lug 14 extending from said bracket 6 towards the axle 11 of the hub of the rear drive wheel of the MTB. This lower rod 12 extends globally parallel to the seat tube 2 to the rear of the latter when the MTB is in a static equilibrium position, i.e. when a cyclist mounts the MTB. The upper rod 13 comprises two axes of rotation 13a, 13b, respectively, articulated on the seat tube 2, globally in its central part, and at the intersection of the vertical tubes 10 and down tubes 9 of the swinging arm 7. Said upper rod 13 extends globally vertically when the MTB is in a static equilibrium position. Moreover, said upper rod 13 is located between the seat 2, down 3 and horizontal 4 tubes of the frame 1 in the plane formed by the latter. The intersection of the straight lines $D_1$, $D_2$ passing via the axes 12a, 12b and 13a, 13b of rotation of each rod 12 and 13 is thus located in the upper rear quadrant of a reference system defined by a horizontal axis H and a vertical axis V convergent with the axis of the bottom bracket 6, i.e. with the axle of the drive sprocket. Furthermore, in a static equilibrium position, this instantaneous centre of rotation C is located on the upper strand of the chain Z, represented as a dot-dash line.

Naturally, the instantaneous centre of rotation C, in a static equilibrium position, may be located just above or just below the upper strand of the chain Z or of the straight line extending it, without thereby departing from the scope of the invention.

Lastly, the MTB comprises a shock absorber 15 whose free ends are secured, respectively, to the upper rod 13 securing the swinging arm 7 to the seat tube 2 and to a link bar 16 extending between said seat tube 2 and the down tube 3 of the frame 1 in the vicinity of the bottom bracket 6, such that the shock absorber 15 extends globally parallel to the seat tube 2 between the down 3, horizontal 4 and seat 2 tubes forming the frame 1.

According to a variant embodiment shown as a dotted line in FIG. 1, the free ends of the shock absorber 15 may be secured, respectively, to the upper rod 13 securing the swinging arm 7 to the seat tube 2 and to a lug 17 of the down tube 3 extending in the plane containing the tubes 2, 3, 4 of the frame 1, such that said shock absorber 15 extends between the tubes 2, 3, 4 constituting the frame 1, forming an angle α with the seat tube 2, said angle α being between 5 and 90°.

Quite obviously, the upper free end of the shock absorber 15 may be secured to the swinging arm 7 and, more particularly, to the intersection of the down tubes 9 and vertical tubes 10 of said swinging arm 7, instead and in place of the rod 13, without thereby departing from the scope of the invention.

The upper rod 13 comprises at least one eye 18 capable of receiving a journal for securing the shock absorber 15 to said rod 13, positioned between the axes 13a, 13b of the rod 13. Said eye 18 of the upper rod 13 is positioned in the central part of the rod 13 at a distance d from the straight line $D_2$ passing via the axes 13a, 13b of the rod 13.

Accessorily, and particularly advantageously, said rod 13 may comprise a second eye 19 capable of receiving the journal for securing the shock absorber 15 to said rod 13, positioned between the first eye 18 and the axis 13b of the rod 13 secured to the swinging arm 7 at a distance $d_1$ from the straight line $D_2$ passing via the axes 13a, 13b of said rod 13 that is greater than the distance d. Thus, the upper end of the shock absorber 15 may be articulated, without distinction, at one or other of the eyes 18, 19 of the rod 13 depending on the desired maximum clearance of the axle 11 of the hub of the rear drive wheel of the MTB. Indeed, by securing the upper end of the shock absorber 15 to the second eye 19 of the rod 13, the cyclist can increase the vertical clearance of the axle 11 of the hub of the rear drive wheel.

Quite obviously, the rod 13 may comprise a plurality of eyes 18, 19, without thereby departing from the scope of the invention.

According to another variant embodiment, shown as a dotted line in FIG. 1, the seat tube 2 comprises, in its lower part, in the vicinity of the axis of the pedals and bottom bracket bearing assembly, a stop 20 extending from said seat tube 2 towards the lower rod, forming substantially a right angle with said seat tube 2. This stop 20 prevents the lower rod 12 from striking the seat tube 2 when an obstacle is overcome.

An explanation will now be given of the way in which the anti-pumping system according to the invention functions, with reference to FIG. 2.

When the axle 11 of the hub of the rear wheel is displaced upwards, as indicated by the arrow a, the instantaneous centre of rotation C of the swinging arm 7 initially located on the upper strand of the chain Z is displaced upwards along a parabolic, curved path T, shown as a dotted line in FIG. 2, towards the axle 11 of the rear hub of the swinging arm 7, such that the tensioned upper strand of the chain Z is then located below said instantaneous centre of rotation C. A righting moment proportional to the tension of the upper strand of the chain Z and to the distance separating said upper strand Z from the instantaneous centre of rotation C of the swinging arm 7 tends to bring the swinging arm 7 back into its initial position of static equilibrium. Thus, the instantaneous centre of rotation C is displaced along a parabolic path whose asymptote A is oriented towards the rear free end of the swinging arm 7 carrying the axle 11 of the rear hub of the drive wheel when said hub of the drive wheel is displaced above its reference position $P_r$, shown as a solid line in FIG. 2. When the vertical clearance of the axle 11 of the hub of the rear wheel, i.e. the height of vertical displacement of said axle 11 of the hub of the rear wheel, is greater than or equal to a specific value, for example 120 mm, the asymptote A of the parabolic path of the instantaneous centre of rotation C extends horizontally. It will be noted that by modifying the dimensions and the inclinations of the rods 12 and 13 in a static equilibrium position, a person skilled in the art will be able to obtain a parabolic path of the instantaneous centre of rotation C such that the latter is located at a globally constant height relative to the upper strand of the transmission chain or of the straight line extending it, the instantaneous centre of rotation C then being located, in a static equilibrium position, just above the upper strand of the transmission chain Z or of the straight line extending it.

It will be furthermore noted that, when the swinging arm 7 is displaced downwards, as indicated by the arrow b, below its, reference position $P_r$, the instantaneous centre of rotation C of the swinging arm 7 is displaced downwards along a rectilinear path forming an angle β with the vertical V, such that the upper strand of the tensioned chain Z is located above said instantaneous centre of rotation C, thereby creating a righting moment proportional to the tension of the upper strand and to the distance separating the latter at the instantaneous centre of rotation C of the swinging arm 7, which tends thus to bring said swinging arm 7 back into its static equilibrium position. Consequently, the righting moment of the swinging arm 7 towards its static equilibrium position is opposed, irrespective of its direction and at all times, to the creation of the parasitic oscillatory movement known as pumping that is created by the cyclist's pedalling movement. Moreover, when the swinging arm 7 is displaced upwards, the parabolic path of the instantaneous centre of rotation C generates a tension in the tensioned upper strand of the chain that is globally constant, thereby avoiding the kick-back effect that is particularly unpleasant for the cyclist.

Figure 3:
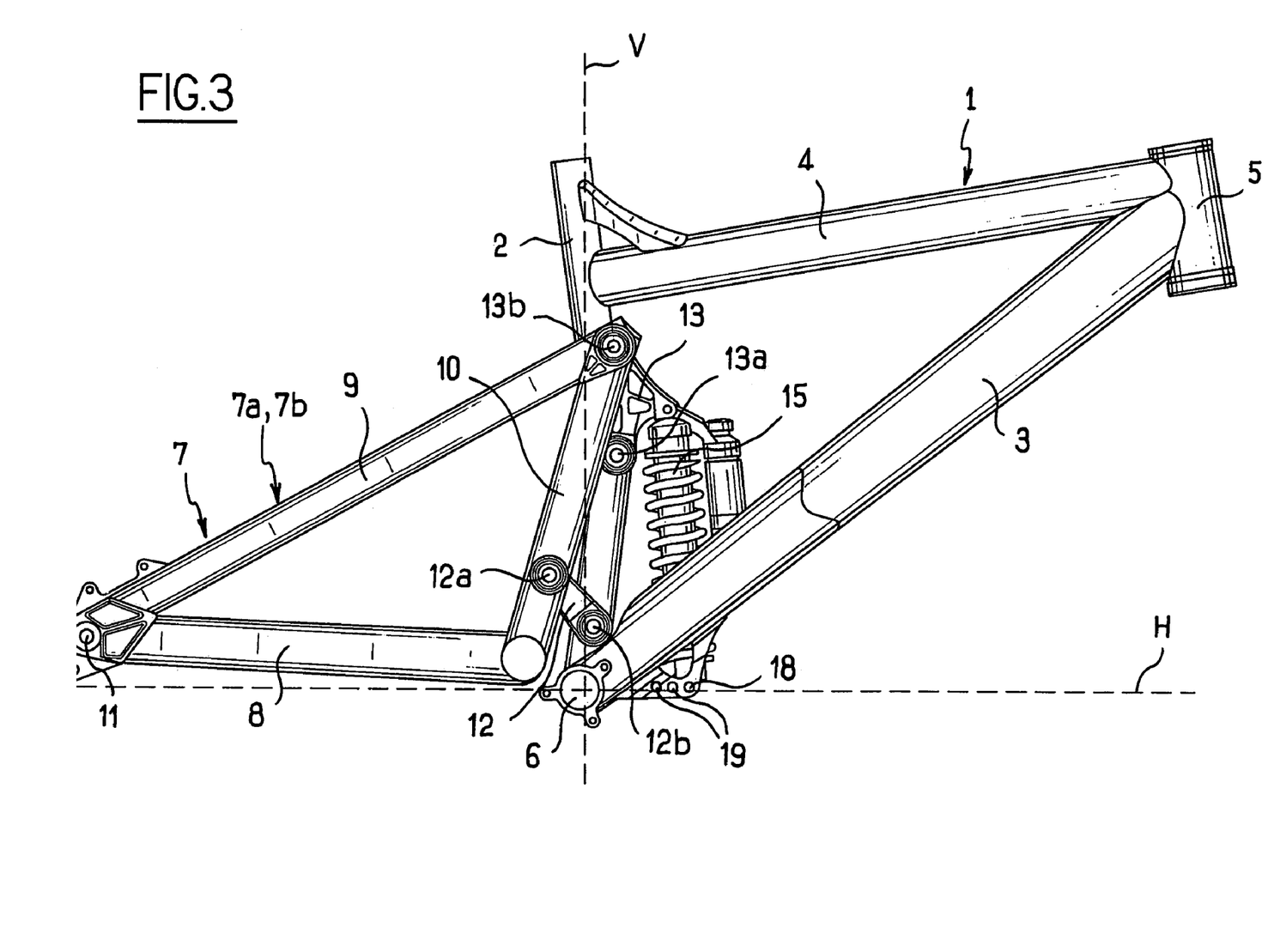
FIG. 3 is a partial side view of a bicycle equipped with a variant embodiment of a rear suspension according to the invention, only the frame and the swinging arm being shown.
Figure 4:
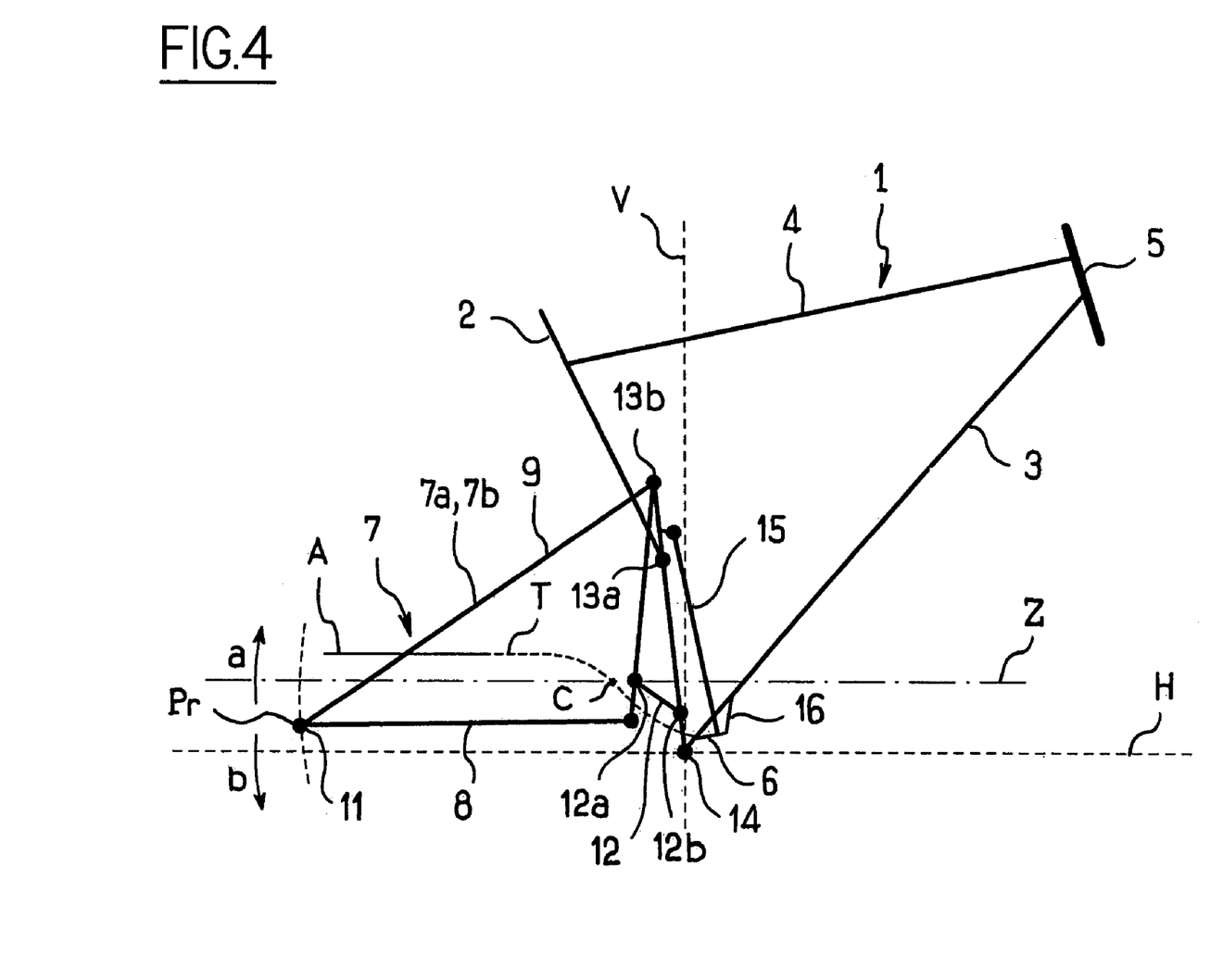
FIG. 4 is a diagrammatic representation of a bicycle equipped with a rear suspension as shown in FIG. 3 and on which the path of the instantaneous centre of rotation of the swinging arm is shown.

According to a variant embodiment that is particularly adapted for descents, with reference to FIGS. 3 and 4, the MTB comprises, in the same way as previously, a "triangulate" frame 1 consisting of a globally vertical seat tube 2, a down tube 3 welded to the lower end of the seat tube 2, a horizontal tube 4 assembled at the lower end of the seat tube 2 and a globally vertical forks tube 5, the down tube 3 also being secured to said forks tube 5, also by means of welding. The seat tube 2 is slightly bent towards the inside of the triangulate frame 1, in its central part.

The swinging arm 7 consists, in the same way as previously, of two triangulate assemblies 7a, 7b extending on either side of the central plane of the frame 1, and it is secured to the frame 1 by two rods 12 and 13, a first "lower" rod 12, whose axes of rotation 12a, 12b positioned at the free end of said lower rod 12 are, respectively, articulated in the vicinity of the lower ends of the vertical tubes 10 of the swinging arm 7 and on the seat tube 2 just above the bottom bracket 6. This lower rod 12 extends to the rear of the seat tube 2, upwards when the MTB is in a static equilibrium position, i.e. when a cyclist mounts the MTB. The upper rod 13 comprises two axes of rotation 13a, 13b, respectively, articulated on the seat tube 2, globally in its central part, at the elbow and at the intersection of the vertical tubes 10 and down tubes 9 of the swinging arm 7. Said upper rod 13 extends globally vertically when the MTB is in a static equilibrium position. Moreover, said upper rod 13 is located between the seat 2, down 3 and horizontal 4 tubes of the frame 1 in the plane formed by the latter. The intersection of the straight lines $D_1$, $D_2$ passing via the axes 12a, 12b and 13a, 13b of rotation of each rod 12 and 13 is thus located in the upper rear quadrant of a reference system defined by a horizontal axis H and a vertical axis V convergent with the axis of the bottom bracket 6, i.e. with the axis of the drive sprocket. Furthermore, in a static equilibrium position, this instantaneous centre of rotation C is located on the upper strand of the chain Z, represented as a dot-dash line.

Obviously, the instantaneous centre of rotation C, in a static equilibrium position, may be located just above or just below the upper strand of the chain Z or of the straight line extending it, without thereby departing from the scope of the invention.

Furthermore, the MTB comprises a shock absorber 15 whose free ends are secured, respectively, to the upper rod 13 securing the swinging arm 7 to the seat tube 2 and to a link bar 16 extending in front of the down tube 3 of the frame 1 in the vicinity of the bottom bracket 6, such that the shock absorber 15 extends globally parallel to the upper rod 13 between the down 3, horizontal 4 and seat 2 tubes forming the frame 1, said shock absorber 15 traversing the down tube 3 in which a hole has been made.

The link bar 16 comprises at least one eye 18 capable of receiving a journal for securing the shock absorber 15 to said link bar 16. Accessorily, and particularly advantageously, said link bar 16 may comprise a plurality of secondary eyes 19 capable of receiving the journal for securing the shock absorber 15 to said link bar 16. Thus, the upper end of the shock absorber 15 may be articulated, without distinction, to one or other of the eyes 18, 19 of the link bar 16, depending on the desired maximum clearance of the axle 11 of the hub of the rear drive wheel of the MTB. Indeed, by securing the upper end of the shock absorber 15 to the second eye 19 of the rod 13, the cyclist can increase the vertical clearance of the axle 11 of the hub of the rear drive wheel.

An explanation will now be given of how the anti-pumping system according to the invention operates, with reference to FIG. 4.

When the axle 11 of the hub of the rear wheel is displaced upwards, as indicated by the arrow a, the instantaneous centre of rotation C of the swinging arm 7 initially located on the upper strand of the chain Z is displaced upwards along a parabolic, curved path T, shown as a dotted line in FIG. 4, towards the axle 11 of the rear hub of the swinging arm 7, such that the tensioned upper strand of the chain Z is then located below said instantaneous centre of rotation C. A righting moment proportional to the tension in the upper strand of the chain Z and to the distance separating said upper strand from the instantaneous centre of rotation C of the swinging arm 7 tends to bring the swinging arm 7 back into its initial position of static equilibrium. Thus, the instantaneous centre of rotation C is displaced along a parabolic path whose asymptote A is oriented towards the rear free end of the swinging arm 7 carrying the axle 11 of the rear hub of the drive wheel when said hub of the drive wheel is displaced above its reference position $P_r$, shown as a solid line in FIG. 4. When the vertical clearance of the axle 11 of the hub of the rear wheel, i.e. the height of the vertical displacement of said axle 11 of the hub of the rear wheel, is greater than or equal to a specific value, for example 140 mm, the asymptote A of the parabolic path of the instantaneous centre of rotation C extends globally horizontally.

Furthermore, when the swinging arm 7 is displaced downwards, as indicated by the arrow b, below its reference position $P_r$, the instantaneous centre of rotation C of the swinging arm 7 is displaced downwards along a curved path, the concavity of the path being globally oriented upwards and forwards, such that the upper strand of the tensioned chain Z is located above said instantaneous centre of rotation C, thereby creating a righting moment proportional to the tension of the upper strand and to the distance separating the latter from the instantaneous centre of rotation C of the swinging arm 7, which tends, therefore, to bring said swinging arm 7 back into its static equilibrium position. Thus, when the swinging arm is displaced downwards, the instantaneous centre of rotation C is displaced downwards and forwards under the upper strand of the tensioned chain Z.

Furthermore, it is quite obvious that the swinging arm 7 may consist of an arm of any form, such as a linear arm, without thereby departing from the scope of the invention.

Moreover, the rods 12, 13 articulating the swinging arm on the frame 1 of the MTB may be replaced by any equivalent means, such as an eccentric, for example.

Lastly, it is quite obvious that the anti-pumping system according to the invention may be adapted to all types of vehicles that have a frame, a swinging arm of the frame carrying the axle integral with the hub of at least one drive wheel and a shock absorber whose ends are secured, respectively, to the frame and to the swinging arm, such as a motorcycle, a quad bike or the like, and that the examples just given are merely special illustrations that are in no way intended to limit the fields of application of the anti-pumping system according to the invention.

The invention claimed is:

1. Rear suspension for a vehicle such as a bicycle, a motorcycle or the like, of the type that includes a frame (1), a swinging arm (7) integral with the frame (1) carrying the axle (11) of the hub of a drive wheel and a shock absorber (15) whose ends are secured, respectively, to the frame (1) and to the swinging arm (7), the drive torque being transmitted to the drive wheel by a chain (Z) extending between a drive sprocket secured to the frame (1) and a driven sprocket secured to the axle (11) of the hub of the drive wheel, said chain (Z) between the drive and driven sprockets forming two strands, the stretched, upper one, which transmits the drive torque to the rear drive wheel, and the other, return lower one, the swinging arm (7) being secured to said frame (1) by at least two articulation means (12, 13) so that the swinging arm (7) pivots about an instantaneous centre of rotation point (C) that is movable when the hub of the drive wheel is displaced on either side of its reference position ($P_r$) corresponding to the position of the axle (11) of the hub of the drive wheel when the vehicle is in a static equilibrium position, characterized in that the instantaneous centre of rotation (C) is displaced upwards along a parabolic path (T), the asymptote (A) of which is oriented towards the rear free end of the swinging arm (7) carrying the axle (11) of the hub of the drive wheel when said hub of the drive wheel is displaced above its reference position ($P_r$).

2. Rear suspension according to claim 1, characterized in that the instantaneous centre of rotation (C) is located on the upper strand of the transmission chain (Z) or on the straight line extending it when the vehicle is in a static equilibrium position.

3. Rear suspension according to claim 1, characterized in that the instantaneous centre of rotation (C) is located just above or just below the upper strand of the transmission chain (Z) or of the straight line extending it when the vehicle is in a static equilibrium position.

4. Rear suspension according to claim 1, characterized in that the instantaneous centre of rotation (C) of the swinging arm (7) is displaced downwards along a rectilinear path forming an angle $\beta$ with the vertical V when the swinging arm (7) is displaced downwards below its reference position ($P_r$) such that the upper strand of the tensioned chain (Z) is located above said instantaneous centre of rotation (C).

5. Rear suspension according to claim 1, characterized in that the instantaneous centre of rotation (C) of the swinging arm (7) is displaced downwards and forwards along a curved path, the concavity of the path being globally oriented upwards and forwards when said swinging arm (7) is displaced downwards below its reference position ($P_r$), such that the upper strand of the tensioned chain (Z) is located above said instantaneous centre of rotation (C).

6. Rear suspension according to claim 1, characterized in that the instantaneous centre of rotation C is located in the upper rear quadrant of a reference system defined by a horizontal axis H and a vertical axis V convergent with the axis of the drive sprocket when the hub of the drive wheel is displaced above its reference position $P_r$.

7. Rear suspension according to claim 1, characterized in that the asymptote A of the parabolic path T of the instantaneous centre of rotation C extends horizontally when the vertical clearance of the axle (11) of the hub of the drive wheel reaches a specific value.

8. Rear suspension according to claim 7, characterized in that the asymptote A of the parabolic path T of the instantaneous centre of rotation C extends horizontally when the vertical clearance of the axle (11) of the hub of the drive wheel is greater than or equal to 120 mm.

9. Rear suspension according to claim 1, characterized in that the articulation means (12, 13) of the swinging arm (7) consist of two rods, an upper rod (13) articulated on the seat tube (2) and a lower rod (12) articulated on the bottom bracket (6) carrying the drive sprocket.

10. Rear suspension according to claim 9, characterized in that the upper rod (13) is articulated in the central part of the seat tube (2).

11. Rear suspension according to claim 9, characterized in that the ends of the shock absorber (15) are secured, respectively, to the swinging arm (7) and/or to the upper rod (13) securing the swinging arm (7) to the seat tube (2) and to a link bar (16) extending between said seat tube (2) and the down tube (3) in the vicinity of the bottom bracket (6), such that the shock absorber (15) extends globally parallel to the seat tube (2).

12. Rear suspension according to either claim 9, characterized in that the ends of the shock absorber (15) are secured, respectively, to the swinging arm (7) and/or to the upper rod (13) securing the swinging arm (7) to the seat tube (2) and to a lug (17) of the down tube (3) extending in the plane containing the tubes (2, 3, 4) of the frame (1), such that said shock absorber (15) extends between the tubes (2, 3, 4) constituting the frame (1), forming an angle a with the seat tube (2).

13. Rear suspension according to claim 12, characterized in that the angle $\alpha$ is between 5 and 90°.

14. Rear suspension according to claim 9, characterized in that the upper rod (13) comprises at least one eye (18) capable of receiving a journal securing the shock absorber (15) to said rod (13), positioned between the axes (13a, 13b) of the rod (13).

15. Rear suspension according to claim 14, characterized in that the eye (18) of the upper rod (13) is positioned in the central part of said rod (13) at a distance d from the straight line $D_2$ passing via the axes (13a, 13b) of the rod (13).

16. Rear suspension according to claim 15, characterized in that the upper rod (13) comprises a second eye (19) capable of receiving the journal securing the shock absorber (15) to said rod (13), positioned between the first eye (18) and the upper axis (13b) of the rod (13) secured to the swinging arm (7) at a distance d' from the straight line D2 passing via the axes (13a, 13b) of the rod (13) that is greater than the distance d of the first eye.

17. Rear suspension according to claim 1, characterized in that the seat tube (2) comprises, in its lower part, in the vicinity of the axis of the pedals and bottom bracket bearing assembly, a stop (20) extending from said seat tube (2) towards the lower rod, forming, substantially, a right angle with said seat tube (2).

18. Rear suspension for a vehicle such as a bicycle, a motorcycle or the like, of the type that includes a frame (10), a swinging arm (7) integral with the frame (1) carrying the axle (11) of the hub of a drive wheel and a shock absorber (15) whose ends are secured, respectively, to the frame (1) and to the swinging arm (7), the drive torque being transmitted to the drive wheel by a chain (Z) extending between a drive sprocket secured to the frame (1) and a driven sprocket secured to the axle (11) of the hub of the drive wheel, said chain (Z) between the drive and driven sprockets forming two strands, the stretched, upper one, which transmits the drive torque to the rear drive wheel, and the other, return lower one, the swinging arm (7) being secured to said frame (1) by at least two articulation means (12,13) so that the swinging arm (7) pivots about an instantaneous centre of rotation point (C) that is movable when the hub of the drive wheel is displaced on either side of its reference position ($P_r$) corresponding to the position of the axle (11) of the hub of the drive wheel when the vehicle is in a static equilibrium position, characterized in that the instantaneous centre of rotation (C) is displaced upwards along a parabolic path (T), the asymptote (A) of which is oriented towards the rear free end of the swinging arm (7) carrying the axle (11) of the hub of the drive wheel when said hub of the drive wheel is displaced above its reference position ($P_r$) and in that the instantaneous centre of rotation (C) of the swinging arm (7) is displaced downwards and forwards along a curved path, the concavity of the path being globally oriented upwards and forwards when said swinging arm (7) is displaced downwards below its reference position ($P_r$), such that the upper strand of the tensioned chain (Z) is located above said instantaneous centre of rotation (C).

19. Rear suspension according to claim 18, characterized in that the instantaneous centre of rotation (C) is located on the upper strand of the transmission chain (Z) or on the straight line extending it when the vehicle is in a static equilibrium position.

20. Rear suspension according to claim 18, characterized in that the instantaneous centre of rotation (C) is located just above or just below the upper strand of the transmission chain (Z) or of the straight line extending it when the vehicle is in a static equilibrium position.

21. Rear suspension according to claim 18, characterized in that the instantaneous centre of rotation (C) of the swinging arm (7) is displaced downwards along a rectilinear path forming an angle β with the vertical V when the swinging arm (7) is displaced downwards below its reference position ($P_r$), such that the upper strand of the tensioned chain (Z) is located above said instantaneous centre of rotation (C).

22. Rear suspension according to claim 18, characterized in that the instantaneous centre of rotation C is located in the upper rear quadrant of a reference system defined by a horizontal axis H and a vertical axis V convergent with the axis of the drive sprocket when the hub of the drive wheel is displaced above its reference position $P_r$.

23. Rear suspension according to claim 18, characterized in that the asymptote A of the parabolic path T of the instantaneous centre of rotation C extends horizontally when the vertical clearance of the axle (11) of the hub of the drive wheel reaches a specific value.

24. Rear suspension according to claim 23, characterized in that the asymptote A of the parabolic path T of the instantaneous centre of rotation C extends horizontally when the vertical clearance of the axle (11) of the hub of the drive wheel is greater than or equal to 120 mm.

25. Rear suspension according to claim 18, characterized in that the articulation means (12,13) of the swinging arm (7) consist of two rods, an upper rod (13) articulated on the seat tube (2) and a lower rod (12) articulated on the bottom bracket (6) carrying the drive sprocket.

26. Rear suspension according to claim 25, characterized in that the upper rod 13 is articulated in the central part of the seat tube (2).

27. Rear suspension according to claim 25, characterized in that the ends of the shock absorber (15) are secured, respectively, to the swinging arm (7) and/or to the upper rod (13) securing the swinging arm (7) to the seat tube (2) and to a link bar (16) extending between said seat tube (2) and the down tube (3) in the vicinity of the bottom bracket (6), such that the shock absorber (15) extends globally parallel to the seat tube (2).

28. Rear suspension according to either claim 25, characterized in that the ends of the shock absorber (15) are secured, respectively, to the swinging arm (7) and/or to the upper rod (13) securing the swinging arm (7) to the seat tube (2) and to a lug (17) of the down tube (3) extending in the plane containing the tubes (2,3,4) of the frame (1), such that said shock absorber (15) extends between the tubes (2,3,4) constituting the frame (1), forming an angle α with the seat tube (2).

29. Rear suspension according to claim 28, characterized in that the angle α is between 5 and 90°.

30. Rear suspension according to claim 25, characterized in that the upper rod (13) comprises at least one eye (18) capable of receiving journal securing the shock absorber (15) to said rod (13), positioned between the axes (13a,13b) of the rod (13).

31. Rear suspension according to claim 30, characterized in that the eye (18) of the upper rod (13) is positioned in the central part of said rod (13) at a distance d from the straight line $D_2$ passing via the axes (13a,13b) of the rod (13).

32. Rear suspension according to claim 31, characterized in that the upper rod (13) comprises a second eye (19) capable of receiving the journal securing the shock absorber (15) to said rod (13), positioned between the first eye (18) and the upper axis (13b) of the rod (13) secured to the swinging arm (7) at a distance d' from the straight line D2 passing via the axes (13a,13b) of the rod (13) that is greater than the distance d of the first eye.

33. Rear suspension according to claim 18, characterized in that the seat tube (2) comprises, in its lower part, in the vicinity of the axis of the pedals and bottom bracket bearing assembly, a stop (20) extending from said seat tube (2) towards the lower rod, forming, substantially, a right angle with said seat tube (2).

34. Rear suspension according to claim 19, characterized in that the instantaneous centre of rotation (C) of the swinging arm (7) is displaced downwards along a rectilinear path forming an angle β with the vertical V when the swinging arm (7) is displaced downwards below its reference position ($P_r$), such that the upper strand of the tensioned chain (Z) is located above said instantaneous centre of rotation (C).

35. Rear suspension according to claim 20, characterized in that the instantaneous centre of rotation (C) of the swinging arm (7) is displaced downwards along a pg,27 rectilinear path forming an angle β with the vertical V when the swinging arm (7) is displaced downwards below its reference position ($P_r$), such that the upper strand of the tensioned chain (Z) is located above said instantaneous centre of rotation (C).

36. Rear suspension according to claim 26, characterized in that the ends of the shock absorber (15) are secured, respectively, to the swinging arm (7) and/or to the upper rod (13) securing the swinging arm (7) to the seat tube (2) and to a link bar (16) extending between said seat tube (2) and the down tube (3) in the vicinity of the bottom bracket (6), such that the shock absorber (15) extends globally parallel to the seat tube (2).

37. Rear suspension according to either claim 26, characterized in that the ends of the shock absorber (15) are secured, respectively, to the swinging arm (7) and/or to the upper rod (13) securing the swinging arm (7) to the seat tube (2) and to a lug (17) of the down tube (3) extending in the plane containing the tubes (2,3,4) of the frame (1), such that said shock absorber (15) extends between the tubes (2,3,4) constituting the frame (1), forming an angle $\alpha$ with the seat tube (2).

* * * * *

UNITED STATES PATENT AND TRADEMARK OFFICE
CERTIFICATE OF CORRECTION

PATENT NO. : 7,427,077 B2 Page 1 of 1
APPLICATION NO. : 11/105226
DATED : September 23, 2008
INVENTOR(S) : Philippe Lesage et al.

It is certified that error appears in the above-identified patent and that said Letters Patent is hereby corrected as shown below:

In Claim 12, in column 10, on line 51, "the frame (1), forming an angle a with the seat tube (2)." should read -- the frame (1), forming an angle α with the seat tube (2).--.

In Claim 35, in column 12, on line 65, "arm (7) is displaced downwards along a pg,27 rectilinear path" should read -- arm (7) is displaced downwards along a rectilinear path--.

Signed and Sealed this

Third Day of March, 2009

JOHN DOLL
*Acting Director of the United States Patent and Trademark Office*